United States Patent
Kumar et al.

(10) Patent No.: US 8,942,130 B2
(45) Date of Patent: Jan. 27, 2015

(54) PEER-TO-PEER COMMUNICATION IN AD HOC WIRELESS NETWORK

(71) Applicant: QUALCOMM Incorporated, San Diego, CA (US)

(72) Inventors: Ravi Kumar, Shrewsbury, MA (US); J. Rodney Walton, Carlisle, MA (US); Qiang Fu, Lexington, MA (US); Subrahmanyam Dravida, Shrewsbury, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/788,841

(22) Filed: Mar. 7, 2013

(65) Prior Publication Data

US 2013/0182614 A1    Jul. 18, 2013

Related U.S. Application Data (62) Division of application No. 11/538,222, filed on Oct. 3, 2006, now Pat. No. 8,576,846.

(60) Provisional application No. 60/724,226, filed on Oct. 5, 2005.

(51) Int. Cl.
*H04L 12/26* (2006.01)
*G08C 15/00* (2006.01)
(Continued)

(52) U.S. Cl.
CPC ......... *H04W 76/021* (2013.01); *H04L 63/0428* (2013.01); *H04W 48/16* (2013.01);
(Continued)

(58) Field of Classification Search
None
See application file for complete search history.

(56) References Cited

U.S. PATENT DOCUMENTS

| 6,192,230 B1 | 2/2001 | Van Bokhorst et al. |
| 6,282,577 B1 | 8/2001 | Okanoue et al. |

(Continued)

FOREIGN PATENT DOCUMENTS

| CN | 1354939 A | 6/2002 |
| CN | 1422045 A | 6/2003 |

(Continued)

OTHER PUBLICATIONS

Aoki, M., et al., "Name Resolution System for Mobile Ad Hoc Networks RANR (Randomly-Assigned Name Resolution)," IPSJ SIG 2002-MBL-20-32, (Mobile Computing and Wireless Communications 20-32 (Mar. 8, 2001)).

(Continued)

*Primary Examiner* — Ashley Shivers
(74) *Attorney, Agent, or Firm* — QUALCOMM IP Department; James Hunt Yancey, Jr.

(57) ABSTRACT

For a peer-to-peer call in an ad hoc wireless network, a wireless device performs discovery of a target wireless device, performs authentication of the target wireless device and generates a session key (e.g., using a pre-shared key or a certificate provisioned on the wireless device), forms an ad hoc wireless network with the target wireless device, and communicates peer-to-peer with the target wireless device via the ad hoc wireless network. The wireless device may perform discovery with a list of identifiers for wireless devices designated to communicate with this wireless device. The wireless device may derive a service set identifier (SSID) used to identify the ad hoc wireless network based on its user-specific identifier (e.g., its phone number) and/or a user-specific identifier for the target wireless device. The wireless device may also performs IP address discovery using the user-specific identifier for the target wireless device.

16 Claims, 8 Drawing Sheets

(51) Int. Cl.

| | | |
|---|---|---|
| *H04J 3/24* | (2006.01) | |
| *H04L 12/28* | (2006.01) | |
| *H04W 76/02* | (2009.01) | |
| *H04L 29/06* | (2006.01) | |
| *H04W 48/16* | (2009.01) | |
| *H04W 28/02* | (2009.01) | |
| *H04W 84/18* | (2009.01) | |
| *H04W 8/00* | (2009.01) | |
| *H04W 12/04* | (2009.01) | |
| *H04W 12/06* | (2009.01) | |

(52) U.S. Cl.
CPC .......... *H04W28/0268* (2013.01); *H04W 84/18* (2013.01); *H04W 8/005* (2013.01); *H04W 12/04* (2013.01); *H04W 12/06* (2013.01)
USPC ......... 370/252; 370/349; 370/392; 370/395.2

(56) References Cited

U.S. PATENT DOCUMENTS

| | | |
|---|---|---|
| 6,571,111 B1 | 5/2003 | Mayo et al. |
| 6,711,409 B1 | 3/2004 | Zavgren, Jr. et al. |
| 6,738,361 B1 | 5/2004 | Immonen et al. |
| 6,842,460 B1 | 1/2005 | Olkkonen et al. |
| 6,931,251 B2 | 8/2005 | Ramakrishnan et al. |
| 7,403,798 B2 | 7/2008 | Doi |
| 7,404,006 B1 | 7/2008 | Slaughter et al. |
| 7,539,507 B2 | 5/2009 | Grob et al. |
| 7,602,756 B2 | 10/2009 | Gu et al. |
| 7,660,287 B2 | 2/2010 | Axelsson et al. |
| 7,680,139 B1* | 3/2010 | Jones et al. ............... 370/414 |
| 2002/0090949 A1* | 7/2002 | Stanforth ............... 455/445 |
| 2002/0143989 A1 | 10/2002 | Huitema et al. |
| 2003/0016732 A1 | 1/2003 | Miklos et al. |
| 2003/0036354 A1 | 2/2003 | Lee et al. |
| 2003/0065851 A1 | 4/2003 | Layman |
| 2003/0065854 A1 | 4/2003 | Bohm et al. |
| 2003/0095546 A1 | 5/2003 | Sakano et al. |
| 2003/0119558 A1 | 6/2003 | Steadman et al. |
| 2003/0120920 A1 | 6/2003 | Svensson |
| 2003/0147367 A1 | 8/2003 | Pucheu et al. |
| 2003/0200455 A1 | 10/2003 | Wu |
| 2004/0063426 A1 | 4/2004 | Hunkeler |
| 2004/0088347 A1 | 5/2004 | Yeager et al. |
| 2004/0152464 A1 | 8/2004 | Sugaya |
| 2004/0162871 A1 | 8/2004 | Pabla et al. |
| 2004/0179488 A1 | 9/2004 | Kim et al. |
| 2004/0185887 A1 | 9/2004 | Wolman et al. |
| 2004/0190467 A1 | 9/2004 | Liu et al. |
| 2004/0228304 A1 | 11/2004 | Riedel et al. |
| 2004/0253943 A1 | 12/2004 | Suzuki et al. |
| 2004/0253970 A1 | 12/2004 | Kunihiro |
| 2004/0264397 A1 | 12/2004 | Benveniste |
| 2005/0053003 A1 | 3/2005 | Cain et al. |
| 2005/0053094 A1* | 3/2005 | Cain et al. .............. 370/469 |
| 2005/0058084 A1 | 3/2005 | Hester et al. |
| 2005/0085261 A1 | 4/2005 | Sugaya |
| 2005/0122903 A1 | 6/2005 | Hultgren et al. |
| 2005/0135305 A1 | 6/2005 | Wentink |
| 2005/0147073 A1 | 7/2005 | Hietalahti et al. |
| 2005/0152305 A1 | 7/2005 | Ji et al. |
| 2005/0153692 A1 | 7/2005 | Hwang et al. |
| 2005/0180439 A1 | 8/2005 | Kondo et al. |
| 2005/0182943 A1 | 8/2005 | Calin |
| 2005/0190759 A1 | 9/2005 | Lee et al. |
| 2005/0198233 A1 | 9/2005 | Manchester et al. |
| 2005/0215234 A1 | 9/2005 | Fukuzawa et al. |
| 2005/0239463 A1 | 10/2005 | Lagnado |
| 2005/0243714 A1 | 11/2005 | Bae et al. |
| 2005/0266798 A1 | 12/2005 | Moloney et al. |
| 2005/0286075 A1 | 12/2005 | Ryu et al. |
| 2006/0017858 A1 | 1/2006 | Lin |
| 2006/0062220 A1 | 3/2006 | Suga |
| 2006/0129630 A1* | 6/2006 | Catalina-Gallego et al. . 709/203 |
| 2006/0142034 A1 | 6/2006 | Wentink et al. |
| 2006/0165056 A1 | 7/2006 | Komaki |
| 2006/0168343 A1 | 7/2006 | Ma et al. |
| 2006/0206592 A1 | 9/2006 | Fujii et al. |
| 2006/0223574 A1 | 10/2006 | Chandra |
| 2006/0253559 A1 | 11/2006 | Espina Perez et al. |
| 2007/0008922 A1 | 1/2007 | Abhishek et al. |
| 2007/0022481 A1* | 1/2007 | Goldman et al. ............... 726/26 |
| 2007/0038743 A1 | 2/2007 | Hellhake et al. |
| 2007/0165670 A1 | 7/2007 | Nagai et al. |
| 2007/0171910 A1 | 7/2007 | Kumar |
| 2007/0189249 A1* | 8/2007 | Gurevich et al. ............. 370/338 |
| 2007/0274232 A1 | 11/2007 | Axelsson et al. |
| 2008/0069105 A1 | 3/2008 | Costa et al. |
| 2008/0194201 A1 | 8/2008 | Sinivaara et al. |
| 2008/0219176 A1 | 9/2008 | Yamada |
| 2008/0261640 A1 | 10/2008 | Yoshida |
| 2012/0179789 A1 | 7/2012 | Griot et al. |
| 2014/0056293 A1 | 2/2014 | Kumar et al. |

FOREIGN PATENT DOCUMENTS

| | | |
|---|---|---|
| CN | 1510871 A | 7/2004 |
| CN | 1559122 | 12/2004 |
| CN | 1631007 A | 6/2005 |
| CN | 1633091 A | 6/2005 |
| CN | 1638351 A | 7/2005 |
| CN | 1650579 A | 8/2005 |
| CN | 1674496 A | 9/2005 |
| DE | 10345051 A1 | 5/2005 |
| EP | 1113628 A2 | 7/2001 |
| EP | 1113629 A2 | 7/2001 |
| EP | 1335563 A2 | 8/2003 |
| EP | 1458151 A1 | 9/2004 |
| EP | 1473870 A2 | 11/2004 |
| EP | 1560399 A1 | 8/2005 |
| JP | 10271117 A | 10/1998 |
| JP | 2003503920 A | 1/2003 |
| JP | 2003513513 A | 4/2003 |
| JP | 2003309558 A | 10/2003 |
| JP | 2004064536 A | 2/2004 |
| JP | 2004080567 A | 3/2004 |
| JP | 2004194329 A | 7/2004 |
| JP | 2004207965 | 7/2004 |
| JP | 2004228926 | 8/2004 |
| JP | 2004530349 A | 9/2004 |
| JP | 2004282758 A | 10/2004 |
| JP | 2004320153 A | 11/2004 |
| JP | 2004328288 A | 11/2004 |
| JP | 2004336779 A | 11/2004 |
| JP | 2005045505 A | 2/2005 |
| JP | 2005057601 A | 3/2005 |
| JP | 2005080158 A | 3/2005 |
| JP | 2005094053 A | 4/2005 |
| JP | 2005101756 A | 4/2005 |
| JP | 2005184824 A | 7/2005 |
| JP | 2005191659 | 7/2005 |
| JP | 2005210328 A | 8/2005 |
| JP | 2005216292 A | 8/2005 |
| JP | 2005223722 A | 8/2005 |
| JP | 3698711 B1 | 9/2005 |
| JP | 2005236416 A | 9/2005 |
| JP | 2005252495 A | 9/2005 |
| JP | 2005529169 A | 9/2005 |
| JP | 2005529514 A | 9/2005 |
| JP | 2007505566 A | 3/2007 |
| JP | 2007507982 A | 3/2007 |
| JP | 2007513541 A | 5/2007 |
| JP | 2007529169 A | 10/2007 |
| KR | 20040074339 | 8/2004 |
| KR | 20040101894 | 12/2004 |
| WO | WO-0101717 A1 | 1/2001 |
| WO | 0131836 A2 | 5/2001 |
| WO | 0237714 A1 | 5/2002 |
| WO | WO-02080397 A2 | 10/2002 |
| WO | 03098383 A2 | 11/2003 |
| WO | 2004088934 | 10/2004 |
| WO | 2004109981 A1 | 12/2004 |
| WO | 2005027263 A2 | 3/2005 |

(56) References Cited

FOREIGN PATENT DOCUMENTS

| WO | WO-2005034536 A1 | 4/2005 |
|----|------------------|--------|
| WO | 2005057956 A1 | 6/2005 |
| WO | 2005074407 A2 | 8/2005 |
| WO | 2006007946 A1 | 1/2006 |

OTHER PUBLICATIONS

Chen, Y., et al., "QoS Requirements of Network Applications on the Internet", Information, Knowledge, Systems Management, IOS Press, vol. 4, 2004, pp. 55-76.

Chlamtac, I et al., "Energy-Conserving Access Protocols for Identification Networks", IEEE/ACM Transaction on Networking, vol. 7, No. 1, pp. 51-59, Feb. 1999.

Conta A., "RFC 3122 Extensions to IPv6 Neighbor Discovery for Inverse Discovery Specification", Transwitch Corporation, Jun. 2011, pp. 2-3 and 6.

European Search Report—EP10004521, Search Authority—Munich Patent Office, May 26, 2010.

European Search Report—EP10004522, Search Authority—Munich Patent Office, May 26, 2010.

European Search Report—EP10004523, Search Authority—Munich Patent Office, May 27, 2010.

European Search Report—EP10004524, Search Authority—Munich Patent Office, May 28, 2010.

European Search Report—EP10004525, Search Authority—Munich Patent Office, May 25, 2010.

European Search Report—EP10004526, Search Authority—Munich Patent Office, Jun. 10, 2010.

European Search Report—EP10006913, Search Authority—Munich Patent Office, Aug. 3, 2010.

Finlayson R., et al., "A Reverse Address Resolution Protocol", IETF RFC 903 (Jun. 1984).

Gali D., et al., "itmBench: Generalized API for Internet Traffic Managers", Proceedings of IEEE Global Telecommunications Conference Workshops, pp. 306-311, Nov. 29, 2004.

Helhake P.R., et al., "A system and method for communication in a Wireless Mobile As-Hcc Network", U.S. Appl. No. 60/681,464, May 17, 2005.

IEEE Std 802.11, Part 11: Wireless LAN Medium Access Control (MAC) and Physical Layer (PHY) specifications ISO/IEC 8802-11 ANSI/IEEE STD 802.11, XX, XX, Jan. 1, 1999, pp. 1,72-78,123, XP002282917.

International Search Report and Written Opinion—PCT/US2006/039278, International Search Authority—European Patent Office—May 31, 2007.

Lefkowitz'S M., "IEEE P802.11 Wireless LANs", Nov. 4, 2003, Trapeze Networks, pp. 2-3.

Li, B., et al., "QoS-Enabled Voice Support in the Next-Generation Internet: Issues, Existing Approaches and Challenges," IEEE Communications Magazine, 2000, vol. 38, Issue 4, pp. 54-61.

Nozawa T., "Corporation Network Frontline: Misawa Home Cut Down 56 Million of Annual Communication Cost in Half by Exchanging CAD Blueprints with 170 Partner Companies", Nikkei Communication, No. 384, Nikkei BP Corp., Feb. 17, 2003.

Sakaguchi Masanori, "Security News & Topics," Security Magazine Vol. 8, Shoeisha Co., Ltd., Feb. 27, 2003, vols. 12 and 18, pp. 100-103.

Taiwan Search Report—TW095137246—TIPO—May 9, 2011.

Zhang J, et al., "Virtual operator based AAA in wireless LAN hot spots with ad-hoc networking support", Jul. 1, 2002, pp. 10-21.

Taiwan Search Report—TW101103684—TIPO—Aug. 21, 2014.

\* cited by examiner

FIG. 1

| Wireless Device | Phone Number | IP Address | SSID | Preshare Key |
|---|---|---|---|---|
| Device_1 | Phone Number_1 | Address_1 | SSID1 | PSK1 |
| Device_2 | Phone Number_2 | Address_2 | SSID2 | PSK2 |
| ... | ... | ... | ... | ... |
| Device_n | Phone Number_n | Address_n | SSIDn | PSKn |

PEER-TO-PEER COMMUNICATION IN AD HOC WIRELESS NETWORK

PRIORITY CLAIM

The present application for patent is a divisional of patent application Ser. No. 11/538,222 entitled "PEER-TO-PEER COMMUNICATION IN AD HOC WIRELESS NETWORK" filed Oct. 3, 2006, which claims priority to provisional U.S. Application Ser. No. 60/724,226, entitled "Methods And Devices For Peer-To-Peer Communication In Wireless Networks," filed Oct. 5, 2005. Both of said applications are incorporated herein by reference as if fully set forth below and for all applicable purposes.

BACKGROUND

I. Field

The present disclosure relates generally to communication, and more specifically to techniques for supporting communication for wireless devices.

II. Background

Wireless communication networks are widely deployed to provide various communication services such as voice, video, packet data, etc. These wireless networks include wireless wide area networks (WWANs) that provide communication coverage for large geographic areas, wireless local area networks (WLANs) that provide communication coverage for medium geographic areas, and wireless personal area networks (WPANs) that provide communication coverage for small geographic areas. Different wireless networks typically have different capabilities, requirements, and coverage areas.

A wireless device (e.g., a cellular phone) may be capable of communicating with one or more wireless networks, e.g., a WWAN and/or a WLAN. The wireless device may also be capable of communicating peer-to-peer with other wireless devices. The wireless device may be invoked by a user to make a call to another wireless device. The wireless device may be located within the coverage of zero, one or multiple wireless networks at the time the call is placed. From the user's perspective, it is desirable for the call to be connected as quickly and efficiently as possible, regardless of whether the wireless device is under the coverage of any wireless network.

There is therefore a need in the art for techniques to efficiently support communication for a wireless device.

SUMMARY

Techniques for supporting peer-to-peer (PTP) communication between wireless devices are described herein. The techniques support communication even when WWAN and WLAN are not present. For a peer-to-peer call, a wireless device performs discovery of a target wireless device, performs authentication of the target wireless device and generates a session key, e.g., using a pre-shared key or a certificate provisioned on the wireless device, forms an ad hoc wireless network with the target wireless device, and communicates peer-to-peer with the target wireless device via the ad hoc wireless network. Each of the phases may be performed in various manners. This aspect may also be implemented via a method, apparatus or computer program product.

In an aspect, a wireless device performs discovery with a list of identifiers. The wireless device receives a frame (e.g., a beacon frame or a probe request) from another wireless device, extracts an identifier from the received frame, determines whether the extracted identifier is included in the list of identifiers, and sends a response if the extracted identifier is included in the list. An identifier may be derived based on one or more phone numbers and/or other identification information for one or more wireless devices. The list may include identifiers for other wireless devices designated to communicate peer-to-peer with this wireless device. This aspect may also be implemented via a method, apparatus or computer program product.

In another aspect, a wireless device performs background or active discovery to discover other wireless devices. For background discovery, the wireless device may periodically send and receive frames for discovery of other wireless devices. Each frame may include an identifier for the sending wireless device. For active discovery, the wireless device may periodically receive frames and may send frames only to discover a target wireless device (e.g., at the start of a call). Each transmitted frame may include an identifier for the target wireless device. For both background and active discoveries, the wireless device may send and/or receive frames during pseudo-randomly selected time intervals or fixed time intervals determined based on timing obtained from a wireless communication network, e.g., a cellular network. This aspect may also be implemented via a method, apparatus or computer program product.

In yet another aspect, a service set identifier (SSID) used to identify an ad hoc wireless network is derived based on one or more user-specific identifiers for one or more wireless devices, e.g., a phone number for a calling wireless device and/or a phone number for a called wireless device in a peer-to-peer call. The SSID may be used as an identifier that is included in each frame sent for discovery. This aspect may also be implemented via a method, apparatus or computer program product.

In yet another aspect, a wireless device performs Internet Protocol (IP) address discovery for a peer-to-peer call. The wireless device forms a packet containing a user-specific identifier (e.g., a phone number) for a target wireless device, sends the packet to request for an IP address of the target wireless device, receives a response including the IP address of the target wireless device, and communicates peer-to-peer with the target wireless device using the IP address. This aspect may also be implemented via a method, apparatus or computer program product.

In yet another aspect, the wireless device handles traffic data for a peer-to-peer call to achieve the desired performance. The wireless device ascertains quality of service (QoS) requirements for a peer-to-peer call with a target wireless device, processes traffic data for the peer-to-peer call in accordance with the QoS requirements, and sends the processed traffic data to the target wireless device. This aspect may also be implemented via a method, apparatus or computer program product.

In a further aspect, a wireless communication device is configured to obtain authorization for communication via a wireless network from a wireless client device of the wireless network and to communicate via the wireless network after obtaining authorization from the wireless client device. This aspect may also be implemented via a method, apparatus or computer program product.

Various aspects and features of the disclosure are described in further detail below.

DETAILED DESCRIPTION

Figure 1:
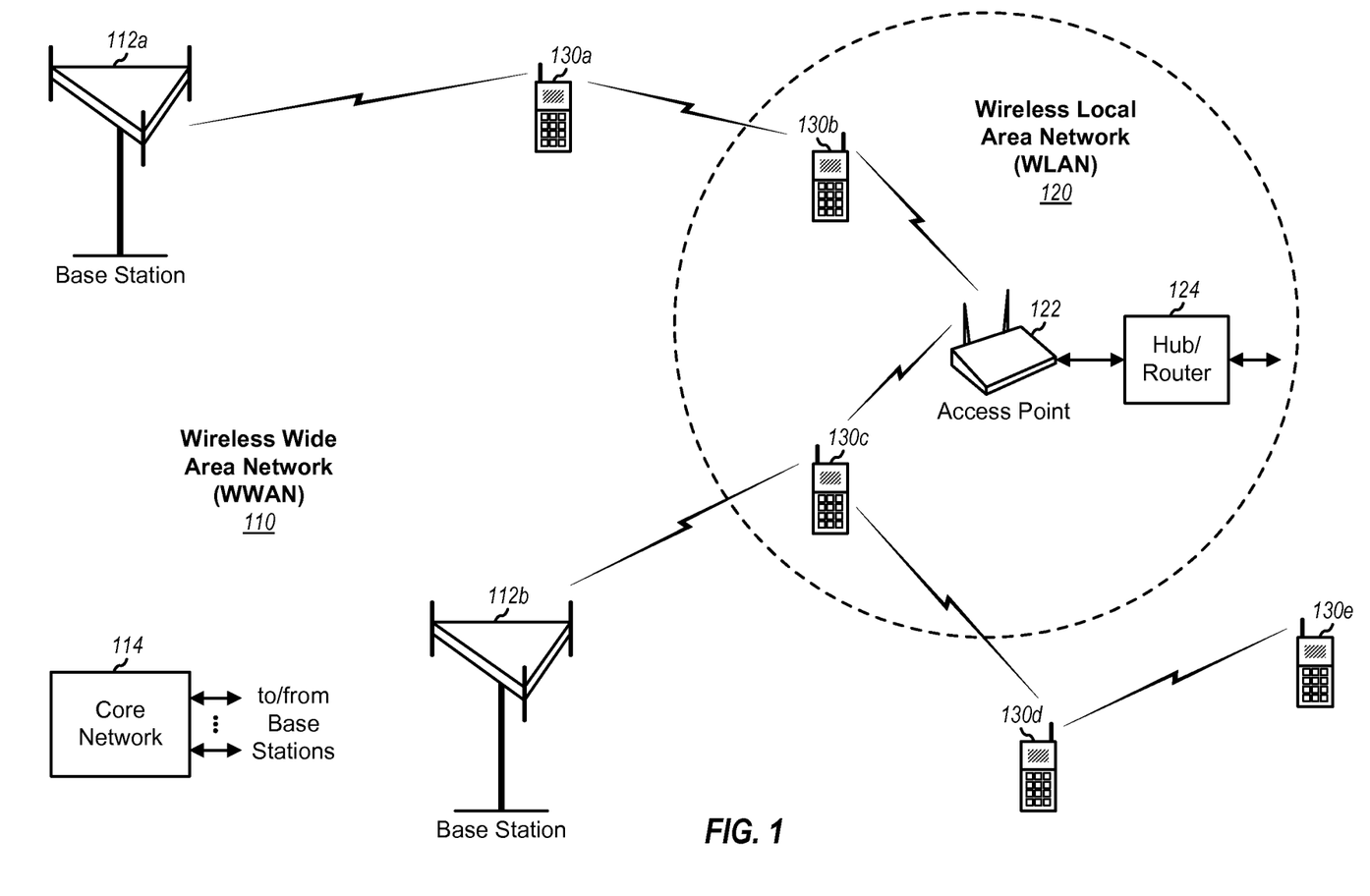
FIG. 1 shows a deployment of a WWAN and a WLAN.

FIG. 1 shows a deployment of a WWAN 110 and a WLAN 120. WWAN 110 provides communication coverage for a large geographic area such as, e.g., a city, a state, or an entire country. WWAN 110 may be a cellular network such as a Code Division Multiple Access (CDMA) network, a Time Division Multiple Access (TDMA) network, a Frequency Division Multiple Access (FDMA) network, an Orthogonal FDMA (OFDMA) network, etc. A CDMA network may utilize a radio technology such cdma2000, Wideband-CDMA (W-CDMA), etc. cdma2000 covers IS-95, IS-2000, and IS-856 standards. A TDMA network may utilize a radio technology such as Global System for Mobile Communications (GSM). These various radio technologies, standards, and cellular networks are known in the art. WWAN 110 may also be a broadcast network such as a MediaFLO network, a Digital Video Broadcasting for Handhelds (DVB-H) network, an Integrated Services Digital Broadcasting for Terrestrial Television Broadcasting (ISDB-T) network, etc. These broadcast networks are also known in the art.

In following description, WWAN 110 is a cellular network that includes base stations that support communication for wireless devices within the coverage area of the WWAN. For simplicity, only two base stations 112a and 112b are shown in FIG. 1. A base station is a station that communicates with the wireless devices. A base station may also be called, and may contain some or all of the functionality of, a Node B, a base transceiver station (BTS), an access point, etc. A core network 114 couples to the base stations and provides coordination and control for the base stations. Core network 114 may also couple to other networks, e.g., a public switched telephone network (PSTN), a wide area network (WAN) such as the Internet, etc.

WLAN 120 provides communication coverage for a medium geographic area such as a mall, an airport terminal, a building, etc. WLAN 120 may include any number of access points that support communication for any number of stations. For simplicity, only one access point 122 is shown in FIG. 1. WLAN 120 may implement the IEEE 802.11 family of standards, some other WLAN standard, or some other WLAN radio technology. The IEEE 802.11 family of standards covers 802.11, 802.11b, 802.11g and 802.11n, which specify different radio technologies. As used herein, Wi-Fi refers to IEEE 802.11 as well as other WLAN standards and radio technologies. Access point 122 may couple to a hub/router 124 that may support communication with a local area network (LAN) and/or a WAN. Access point 122 and hub/router 124 may also be combined into a single wireless router.

Wireless devices 130 may be dispersed throughout the coverage areas of WWAN 110 and WLAN 120 as well as outside the coverage of these wireless networks. For simplicity, only five wireless devices 130a through 130e are shown in FIG. 1. A wireless device may be stationary or mobile. A wireless device may also be called, and may contain some or all of the functionality of, a mobile station, a user equipment, a station, a terminal, an access terminal, a subscriber unit, etc. A wireless device may be a cellular phone, a handheld device, a personal digital assistant (PDA), a laptop computer, a wireless modem, a handset, etc.

A wireless device may be capable of communicating with any number of wireless networks of any radio technologies. For example, a wireless device may be capable of communicating with WWAN 110 and/or WLAN 120. A wireless device may thus be a WWAN device as well as a WLAN station, e.g., a cellular phone with Wi-Fi capabilities.

A wireless device may be able to communicate with zero, one, or multiple wireless networks at any moment depending on (a) the capabilities of the wireless device and (b) the location of the wireless device, e.g., whether it is located within the coverage of any wireless network. In the example shown in FIG. 1, wireless device 130a can communicate with WWAN 110, wireless device 130b can communicate with WLAN 120, wireless device 130c can communicate with both WWAN 110 and WLAN 120, and wireless devices 130d and 130e are outside of the coverage of WWAN 110 and WLAN 120.

Wireless devices with Wi-Fi capabilities may be able to communicate directly with each other via ad hoc wireless networks. An ad hoc wireless network is a wireless network that may be formed on the fly as needed, typically without a central controlling entity such as an access point, and may be dissolved when no longer needed. An ad hoc wireless network may be formed by, and may include, wireless devices desiring to communicate peer-to-peer with one another.

Peer-to-peer (PTP) and push-to-talk (PTT) features may be supported in wireless devices using Wi-Fi capabilities. PTT typically involves maintaining a connection so that communication can quickly commence when initiated by a user. The PTP and PTT features may be desirable in various scenarios. For example, a family may visit a mall, and each family member may go to a different store. The family members may be able to keep in touch by calling one other directly using Wi-Fi. As another example, a group may go on a hike where WWAN coverage is not available. The group members may be able to communicate with one another using Wi-Fi.

The techniques described herein may be used for various types of call between Wi-Fi enabled wireless devices. For example, the techniques may be used for Voice-over-Internet Protocol (VoIP) calls, data calls, video calls, Short Message Service (SMS) messaging, etc.

A peer-to-peer call between two wireless devices includes the following phases:

1. Discovery—discover the presence of other wireless device(s) via Wi-Fi,

2. Session security—establish a session key for use during the call,
3. Call establishment—exchange signaling to set up the call,
4. Data exchange—schedule and handle traffic data to achieve the desired QoS, and
5. Call release—exchange signaling to release the call.

Additional phases such as IP address discovery may be present for some calls.

A peer-to-peer call may be established under one of the following scenarios:
1. WWAN and WLAN are both not present,
2. WWAN is present but WLAN is not present,
3. WWAN is not present but WLAN is present, and
4. WWAN and WLAN are both present.

Some of the phases may be performed in different manners depending on whether WWAN and/or WLAN are present, as described below.

Discovery

Discovery may be performed in various manners—with and without WLAN and with and without WWAN. To facilitate discovery, e.g., when WLAN and WWAN are not present, a wireless device may be provisioned with a list of identifiers for other wireless devices that can communicate peer-to-peer with this wireless device. This list may be referred to as a PTP list, a "buddy" list, etc. The provisioning of the PTP list may be done by a service provider, a user, and/or some other entity. For example, the wireless device may have a phone book of numbers for convenient dialing, and all wireless numbers or just certain wireless numbers in the phone book may be included in the PTP list. The PTP list may be provisioned on the wireless device and may include all phone numbers that the user expects to communication with via peer-to-peer.

Figure 2:
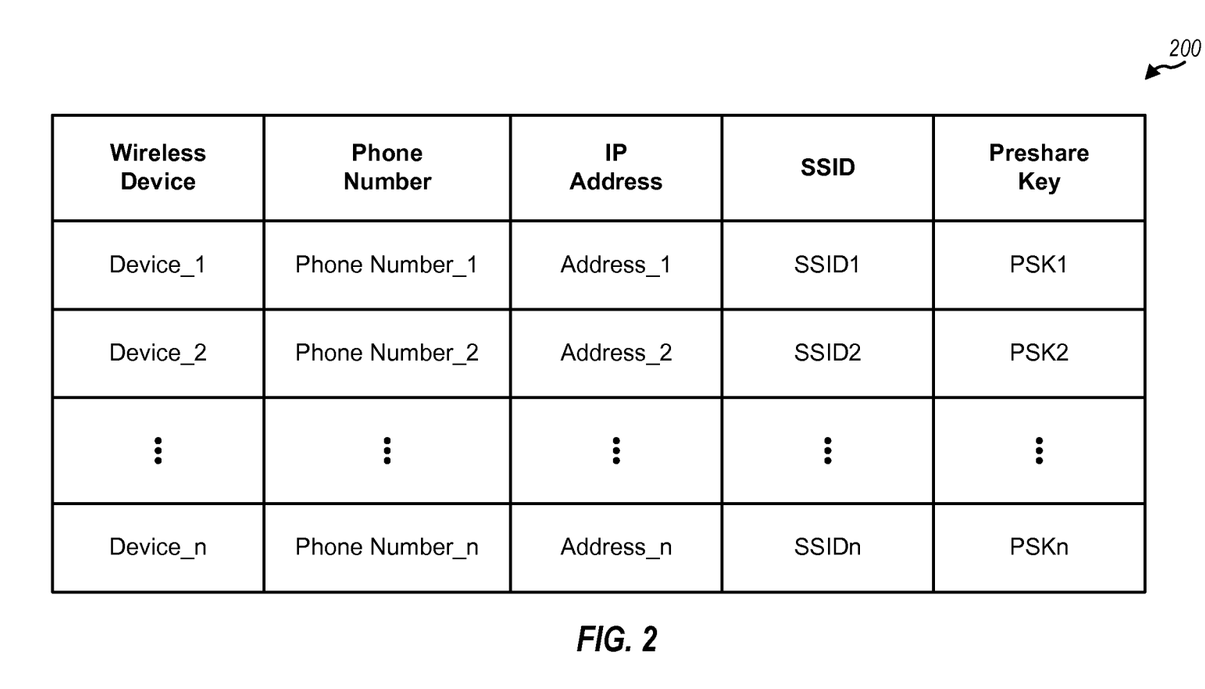
FIG. 2 shows a list of identifiers provisioned on a wireless device.

FIG. 2 shows a design of a PTP list 200 provisioned on a wireless device. In this design, the PTP list has one entry for each of the other wireless devices that can communicate peer-to-peer with this wireless device. The entry for each wireless device may include a phone number, an IP address, an SSID, a pre-share key (PSK), etc. The SSID and PSK are described in further detail below. In general, each entry may include any type of information, e.g., more, less, or different information than the information shown in FIG. 2. The fields for each entry may or may not be populated. For example, if the IP address for a given wireless device is not known, then this IP address may not be present in the PTP list and may be obtained using one of the mechanisms described below.

In one design, which is referred to as background discovery, a wireless device periodically sends and receives frames for discovery of other wireless devices. Each wireless device periodically sends beacon frames, with each beacon frame containing an identifier for the sending wireless device. A beacon frame is a management frame that conveys certain information regarding the sending wireless device. In general, an identifier may be an SSID, a phone number, a hash of the phone number, or some other identification information. Other wireless devices in the vicinity of the sending wireless device receive the beacon frames. Each receiving wireless device extracts the identifier from each received beacon frame and compares the extracted identifier against the identifiers in its PTP list. If the extracted identifier is included in the PTP list, then the receiving wireless device sends a response back to the sending wireless device. After discovery, the sending and receiving wireless devices may engage in the next phase, e.g., authentication, if a call is initiated between the two wireless devices. The PTP list may be used to filter unwanted frames and to respond to frames from only wireless devices of interest.

A wireless device may operate in a power save mode to conserve battery power. In the power save mode, the wireless device may power up periodically for a short period of time to send and/or receive frames and may power down in the time between the awake periods. The wireless device may thus operate in accordance with a sleep-awake cycle, which is one cycle of an awake period and a sleep period.

The wireless devices are generally not synchronized in time and, while in the power save mode, their sleep-awake cycles are likely to be different. Hence, even though the wireless devices may be close by, one wireless device may be asleep when another wireless device is sending a frame, and vice versa. To combat unsynchronized timing, the wireless devices may wake up randomly to send and/or receive frames. A wireless device may use a random number generator to select when to wake up next, then go to sleep, and then wake up at the expiry of the randomly selected time. The amount of time for two wireless devices to discover one another may then be dependent on the awake duration and the sleep-awake cycle. For example, if each wireless device is awake for a 10 millisecond (ms) period within a sleep-awake cycle of 100 ms, then the two wireless devices will discover each other with high probability after seconds.

A wireless device may turn off its radio frequency (RF) and physical layer (PHY) sections during sleep time, and only a processor may be awake. The processor may use a timer to trigger power up of the RF and PHY sections, to send frames, and to scan the wireless medium for frames from other wireless devices. The wireless device may be awake, e.g., for 10 ms in a sleep-awake cycle of 100 ms. All wireless devices may have the same sleep-awake cycle but may not be synchronized. The 100 ms sleep-awake cycle may be partitioned into ten slots, with each slot having a duration of 10 ms. The wireless device knows its sleep-awake cycle duration and keeps track of the ten slots in the sleep-awake cycle. In a given sleep-awake cycle, the processor may select a random number between 0 and 9 and may turn on the RF and PHY sections in the selected slot to listen for frames from other wireless devices. If no frames are received during the selected slot, the processor may turn off the RF and PHY sections. In the next sleep-awake cycle, the processor may again select a random number and may repeat the process. If another wireless device in the vicinity is doing the same transmit and receive processing, then there is over 99% chance that the two wireless devices will discover each other in five seconds. The discovery time may be greater or less depending on the duty cycle, which is the ratio of the awake duration to the sleep-awake cycle duration. However, this processing is background activity and power, is mainly consumed during the awake time of the sleep-awake cycle.

In another design, which is referred to as active discovery, a wireless device periodically receives frames from other wireless devices but sends frames only to discover a target wireless device, e.g., when a call is made. When a user places the call, the calling wireless device enters a discovery mode and broadcasts a probe request containing an identifier for a called wireless device. The calling wireless device then waits for a probe response from the called wireless device and, if none is received within a predetermined amount of time, sends another probe request. The calling wireless device may also continuously send probe requests through at least one sleep-awake cycle because the called wireless device may be in the power save mode. The calling wireless device may send probe requests through a sufficient number of sleep-awake cycles of the called wireless device in order to ensure that the called wireless device is given sufficient opportunity to receive a probe request. To cover the case in which the called wireless device is operating on a different frequency channel, the calling wireless device may send probe requests for at least one sleep-awake cycle on one frequency channel and, if a probe response is not received, switch to another frequency channel and continue to send probe requests. When the called wireless device receives a probe request and determines that the probe request is addressed to it, the called wireless device sends a probe response to the calling wireless device.

With active discovery, a wireless device sends probe requests only when needed, e.g., when a call is made. All wireless devices are in a passive listen mode whenever they are awake. To combat unsynchronized timing, a calling wireless device may send probe requests at randomly selected time intervals. Each wireless device may listen for probe requests in randomly selected time intervals.

Active and background discoveries may be enhanced by the presence of WWAN and/or WLAN. The wireless devices may be able to obtain timing from the WWAN or WLAN and may use the timing to achieve time synchronization. The wireless devices may schedule their beacon frames and/or probe requests based on the timing from the WWAN or WLAN. For example, when a call is placed, the calling wireless device may send a probe request at a predetermined time. Other wireless devices are awake at that time because of the synchronization provided by the WWAN or WLAN timing and can efficiently receive the probe request from the calling wireless device.

Discovery may also be performed with assistance from the WWAN and/or WLAN, if present. For example, the calling wireless device may communicate with the WWAN or WLAN and may request the WWAN or WLAN to page the called wireless device. The called wireless device may respond to the WWAN or WLAN or directly to the calling wireless device.

WLAN devices may operate on different frequency channels, which may be determined by regulatory agencies. For example, in the United States, there are 11 frequency channels in 802.11b/g and 12 frequency channels in 802.11a. A wireless device may send and/or receive frames on one or more frequency channels for discovery. The specific frequency channel(s) to use for discovery may be determined in various manners. In one design, when WLAN and WWAN are not present, one or more frequency channels may be configured by the service provider or user. For example, the configured frequency channel(s) may be included in the PTP list. For background discovery, the wireless device may broadcast beacon frames on each configured frequency channel, e.g., by cycling through all configured frequency channels. For active discovery, the wireless device may send probe requests on all configured frequency channels, e.g., by cycling through all frequency channels and sending probe requests through at least one sleep-awake cycle for each frequency channel.

When WWAN is present, the channel selection may be controlled by the WWAN. For example, the WWAN may indicate (e.g., broadcast) one or more specific frequency channels available for use. When WLAN is present, the wireless device may operate on the same frequency channel used by the WLAN and/or may operate on other frequency channel(s).

An 802.11 wireless network is identified by an SSID, which is the name of the wireless network. The SSID is included in certain types of frames such as beacon frames, probe requests, probe responses, etc. A basic service set identifier (BSSID) is a 48-bit identifier that all wireless devices in a basic service set (BSS) include in the header of data frames, poll frames, etc. In an infrastructure BSS with an access point, the BSSID is a Medium Access Control (MAC) address of the access point. In an independent BSS (IBSS) without an access point, a wireless device may randomly select a BSSID.

An access point in a WLAN periodically broadcasts the SSID in beacon frames. The wireless devices can obtain the SSID from the beacon frames and use the SSID in probe requests and probe responses sent by these wireless devices. When a WLAN is not present, an SSID for an ad hoc wireless network may be formed in various manners.

In one design, an SSID is formed based on a user-specific identifier for a sending/calling wireless device. For example, the SSID may be set to the phone number of the sending wireless device, a hash of the phone number, some other identification information, etc. For this design, the PTP list for a given wireless device may contain an SSID for each wireless device included in the PTP list, e.g., as shown in FIG. 2. For background discovery, the sending wireless device may periodically send beacon frames containing its SSID. Other wireless devices receive the beacon frames, extract the SSID from each beacon frame, compare the extracted SSID against the SSIDs included in their PTP lists, and respond to the sending wireless device if there is a match.

In another design, an SSID is formed based on a user-specific identifier for a target/called wireless device. For active discovery, the sending wireless device may send probe requests containing the SSID for the target wireless device. Other wireless devices receive the probe requests, extract the SSID from each probe request, compare the extracted SSID against their own SSIDs, and respond to the sending wireless device if there is a match. This design allows each wireless device to listen to only one SSID, which is the SSID for that wireless device. Each wireless device may use its SSID to filter received frames and may respond only to frames sent with its SSID.

In yet another design, an SSID is formed based on user-specific identifiers for the sending and target wireless devices. For this design, the PTP list for a given wireless device may contain an SSID for each wireless device included in the PTP list. For active discovery, the sending wireless device may send probe requests containing the SSID for the target wireless device. The target wireless device can ascertain both the sender of the probe requests and the intended recipient based on the SSID.

Once the wireless devices discover one another, an ad hoc wireless network may be formed as described in IEEE 802.11. The wireless device with the fastest clock becomes an access point for the ad hoc wireless network and transmits beacon frames that are used by other wireless device(s) to synchronize their timing.

Security

Security for a peer-to-peer call may be achieved in various manners—with and without WLAN and with and without WWAN. To facilitate security, e.g., when WLAN and WWAN are not present, a wireless device may be provisioned with a pre-shared key (PSK) for each wireless device included in its PTP list, e.g., as shown in FIG. 2. A PSK is a secret key that is shared between two wireless devices in a pair-wise manner. The provisioning of the PSKs may be done by the service provider, the user, and/or some other entity. For example, a PSK for two wireless devices may be generated based on a hash of the serial numbers of these two devices, passwords created for these devices, etc. For a given wireless device, the PSKs for all wireless devices in the PTP list are provisioned on that wireless device. The PSKs may be used for security as described below.

After completing discovery, the calling and called wireless devices may perform handshake to authenticate one another and to generate session keys. The wireless devices may use the PSK for authentication as described in IEEE 802.11. The wireless devices may then use the PSK to generate a pair-wise master key (PMK) and a group master key (GMK). The wireless devices may then use the PMK and GMK to generate session keys as described in IEEE 802.11i. The wireless devices may thereafter use the session keys to encrypt traffic data exchanged during the call.

A wireless device may also be provisioned with a certificate (e.g., an X.509 certificate) by the service provider. The certificate may contain one or more digital signatures that may be used to authenticate information received from another entity. The certificate may also be used for security. The calling and called wireless devices may perform handshake to authenticate one another and to generate session keys using the certificate, e.g., as described in IEEE 802.11i.

Security may also be achieved in other manners when the WWAN is present. In one design, authentication is achieved via signaling with the WWAN using security protocols supported by the WWAN. For example, the wireless devices in a peer-to-peer call may perform Challenge Handshake Authentication Protocol (CHAP), Authentication and Key Agreement (AKA), Session Initialization Protocol (SIP) authentication, etc. with the WWAN. In another design, the WWAN assigns the PMK and GMK to the wireless devices, which may use the PMK and GMK to generate session keys. In general, authentication may be performed peer-to-peer or via the WWAN or WLAN while encryption may be performed by the wireless devices.

A WLAN may be present but may defer to a client device in the WLAN to authenticate and/or authorize another device requesting access to the WLAN or to local content. For example, a user with device A may visit a location with a WLAN, e.g., another user's home or a store. The user with device A may desire to make a VoIP call via the WLAN. The user with device A may be required to obtain permission from another person at the location (e.g., the home owner or store manager) before the WLAN will allow the VoIP call to be placed. In this case, a client device of the person at the location may become a surrogate administrative network element. Device A may perform authentication with the client device and/or may obtain authorization from the client device. The client device may then send a command to the network administrative element to allow device A to access the WLAN. Device A may be granted access in full or partial, timer based or unrestricted, etc. For example, device A may be granted access just for the present VoIP call, for a specific time duration, for certain content, etc.

A wireless device requesting access to a WLAN may not be on an administrator list of wireless devices allowed to access the WLAN. An administrator for the WLAN may be given the option to add this wireless device to the list, e.g., temporarily or permanently. The wireless device may be allowed to access the WLAN after being added to the list.

IP Address Discovery

The wireless devices may communicate using IP at a network layer and Ethernet at a link layer. In this case, IP packets may be encapsulated in Ethernet frames, which are exchanged between the wireless devices. Each wireless device uses IP addresses for exchanging IP packets and MAC addresses for exchanging Ethernet frames. Each IP packet includes a source IP address for the sending wireless device and a destination IP address for the recipient wireless device. Similarly, each Ethernet frame includes a source MAC address for the sending wireless device and a destination MAC address for the recipient wireless device.

A wireless device may store the IP address and MAC address of each wireless device included in the PTP list. The wireless device may communicate with another wireless device in the PTP list using the IP address and MAC address stored in the PTP list.

A wireless device may not know the IP address and/or the MAC address of another wireless device. The wireless device may obtain the IP address and/or MAC address in various manners, e.g., after completing the discovery and security phases.

In one design, which may be used when the WLAN is present, the wireless devices register with the WLAN and provide their user-specific identifiers (e.g., phone numbers) as well as IP addresses. A server, such as a domain name system (DNS) server or a dynamic host configuration protocol (DHCP) server, may store the user-specific identifiers and IP addresses of the registered wireless devices. When an inquiring wireless device desires the IP address of a target wireless device, the inquiring wireless device queries the server with the user-specific identifier for the target wireless device. The server would then return the IP address of the target wireless device. The inquiring wireless device may then obtain the MAC address of the target wireless device, if needed, using Address Resolution Protocol (ARP). For ARP, the inquiring wireless device broadcasts an ARP packet with the IP address of the target wireless device. Other wireless devices receive the ARP packet. Each wireless device determines whether the IP address included in the ARP packet is its IP address and, if so, responds with its MAC address.

In another design, which may be used even when the WLAN is not present, the inquiring wireless device uses reverse ARP (R-ARP) to obtain the IP address of the target wireless device. In this design, the inquiring wireless device broadcasts an R-ARP packet containing the user-specific identifier (e.g., phone number) for the target wireless device. The R-ARP packet may be sent in a multi-cast mode so that it is not restricted to the sub-net in which the inquiring wireless device is located. Other wireless devices receive the R-ARP packet. Each wireless device determines whether the user-specific identifier included in the R-ARP packet is its user-specific identifier and, if so, responds by sending its IP address in a uni-cast IP packet to the inquiring wireless device.

Call Setup

Once security is established for a peer-to-peer call and the IP and MAC addresses are resolved, the wireless device may exchange signaling for call setup using SIP or some other suitable protocol. SIP is a signaling protocol for initiating, modifying, and terminating interactive user sessions based on IP (e.g., a VoIP call). Most SIP implementations assume that there is centralized control. The peer-to-peer call may be set up in an ad hoc mode between the wireless devices. In the ad hoc mode, SIP is supported without centralized control, and enhancements for peer-to-peer signaling may be used.

When the WWAN is present, signaling for call setup and teardown may be sent via the WWAN. When the WLAN is present, discovering, security, data connectivity, etc., may be performed via the WLAN. When the WWAN and WLAN are both present, information may be exchanged between the WWAN and WLAN, e.g., through a combined network management system. The exchanged information may include location information, timing information, etc. and may be used for call setup, handoff, etc.

When the WWAN is present, a wireless device may initiate a call to another wireless device via the WWAN. The WWAN may be aware of the locations of the two wireless devices and may determine that the call can be placed on the WLAN or via peer-to-peer. The WWAN may then direct the two wireless devices to set up the call on the WLAN or peer-to-peer and may be able to save air-link resources for other calls that cannot be placed on the WLAN or via peer-to-peer. The WWAN may thus off-load calls when possible.

Data Handling

Different types of call may have different data and QoS requirements. For example, a VoIP call may have certain requirements on delay. A higher-layer application that is responsible for call setup may be aware of the requirements of the call being placed and can determine how traffic data for the call should be handled. The higher-layer application may convey traffic handling information to lower layers that are responsible for transmission and reception of the traffic data.

In one design, the higher-layer application marks packets using one or more fields of a packet header. IP version 4 (IPv4) includes an 8-bit type of service (TOS) field that may be used to convey the desired QoS. The TOS field includes a 3-bit precedence subfield used to indicate the precedence (or importance) of the traffic data and three 1-bit subfields used to indicate the desired delay, throughput, and reliability. IPv4 is described in RFC 791. IP version 6 (IPv6) includes an 8-bit traffic class field that may be used to identify and distinguish between different classes or priorities of packets. IPv6 is described in RFC 2460. The TOS field in IPv4 and the traffic class field in IPv6 may be replaced with an 8-bit differentiated services (DS) field described in RFC 2474. The DS field includes a 6-bit differentiated services code point (DSCP) subfield that carries a code point that defines the per-hop behavior (PHB) for an IP packet. The higher-layer application may also mark packets in other manners using other fields.

At call setup, a table may be created with one or more values for each subfield to be marked and, for each value, the corresponding handling for packets marked with that value. Thereafter, packet filtering may be performed based on the table. Packets matching the filtering criteria are handled as specified by the table.

In another design, application programming interfaces (APIs) are used to achieve the desired handling of the traffic data for the call. The higher-layer application may call APIs, which are drivers that process the traffic data passing between the higher and lower layers. The APIs may perform traffic classification by looking at portions of IP header and/or headers of higher layer protocols such as Transmission Control Protocol (TCP), User Datagram Protocol (UDP), etc.

In yet another design, operating system (OS) functions are used to achieve the desired handling of the traffic data for the call. The traffic data may be stored in a buffer having a control section. The control section indicates how the traffic data in the buffer should be handled by the lower layers and may be appropriately marked via the OS functions. Different operating systems may have different implementations for marking the buffer. The buffer may thus be marked in accordance with the operating system used for the wireless device.

Some examples of how the different phases of a peer-to-peer call may be performed in the four scenarios are given below.

When WWAN and WLAN are both not present.
Perform background or active discovery,
Perform security peer-to-peer using a PSK or certificate,
Exchange signaling for call setup and teardown peer-to-peer via SIP,
Exchange data peer-to-peer.
When only WWAN is present.
Use WWAN timing for background or active discovery,
Perform security peer-to-peer or via WWAN,
Exchange SIP signaling for call setup and teardown peer-to-peer or via WWAN,
Exchange data peer-to-peer.
When only WLAN is present.
Perform background or active discovery via WLAN,
Perform security peer-to-peer or via WLAN,
Exchange SIP signaling for call setup and teardown peer-to-peer or via WLAN,
Exchange data peer-to-peer or via WLAN.
When WWAN and WLAN are both present.
Perform discovery via peer-to-peer, WWAN or WLAN,
Perform security via peer-to-peer, WWAN or WLAN,
Exchange SIP signaling for call setup and teardown via peer-to-peer or WWAN,
Exchange data peer-to-peer or via WLAN.

IP address discovering may be performed, if needed, for each of the four scenarios described above.

Figure 3:
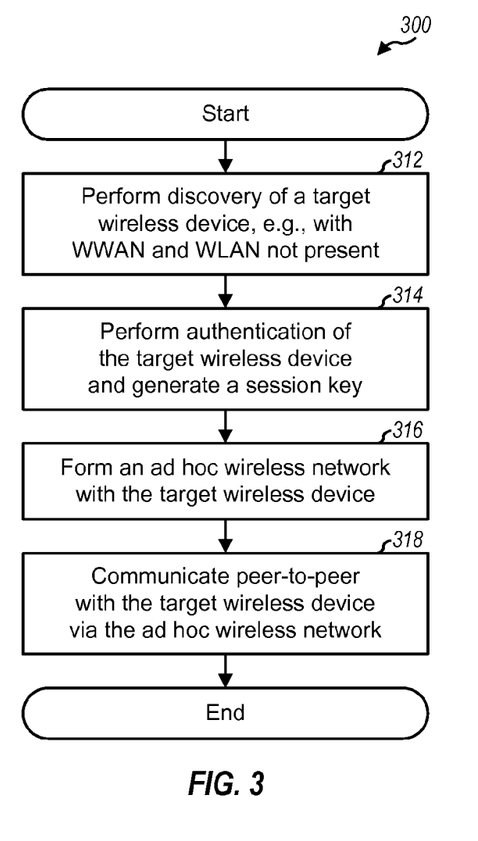
FIG. 3 shows a process for communicating peer-to-peer.

FIG. 3 shows a process 300 for communicating peer-to-peer. A wireless device performs discovery of a target wireless device, e.g., with WWAN and WLAN not present (block 312). The wireless device performs authentication of the target wireless device and generates a session key, e.g., using a pre-shared key or a certificate provisioned on the wireless device (block 314). The wireless device forms an ad hoc wireless network with the target wireless device (block 316) and communicates peer-to-peer with the target wireless device via the ad hoc wireless network using the session key (block 318).

Figure 4:
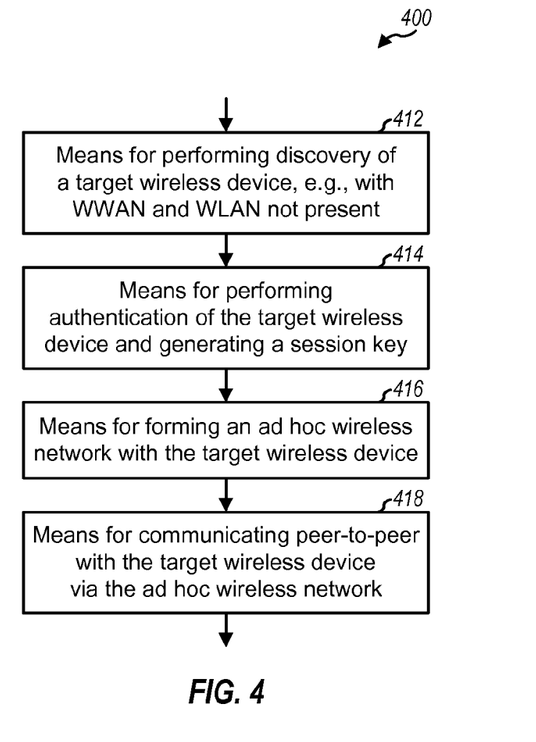
FIG. 4 shows an apparatus for communicating peer-to-peer.

FIG. 4 shows an apparatus 400 for communicating peer-to-peer. Apparatus 400 includes means for performing discovery of a target wireless device (block 412), means for performing authentication of the target wireless device and generating a session key (block 414), means for forming an ad hoc wireless network with the target wireless device (block 416), and means for communicating peer-to-peer with the target wireless device via the ad hoc wireless network using the session key (block 418).

Figure 5:
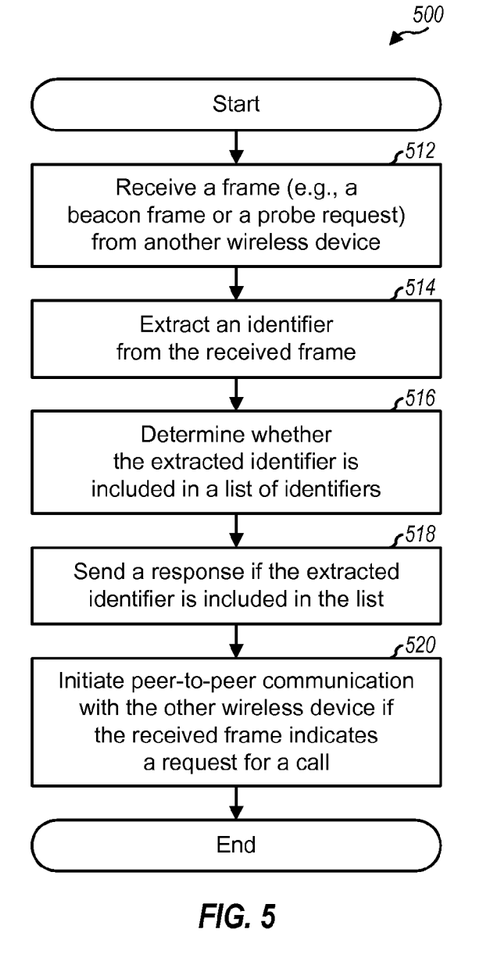
FIG. 5 shows a process for performing discovery with a list of identifiers.

FIG. 5 shows a process 500 for performing discovery with a list of identifiers. A wireless device receives a frame (e.g., a beacon frame or a probe request) from another wireless device (block 512). The wireless device extracts an identifier from the received frame (block 514) and determines whether the extracted identifier is included in the list of identifiers provisioned on the wireless device (block 516). An identifier may be an SSID or some other type of identifier. An identifier may be derived based on (a) a phone number or some other identification information for this wireless device and/or (b) a phone number or some other identification information for the other wireless device. The list may include identifiers for wireless devices designated to communicate with this wireless device. The wireless device sends a response if the extracted identifier is included in the list (block 518). The wireless device may initiate peer-to-peer communication with the other wireless device if the received frame indicates a request for a call (block 520).

The wireless device may perform background discovery and may periodically send and receive frames for discovery of other wireless devices. Each frame may include an identifier for the sending wireless device. The wireless device may also perform active discovery and may periodically listen for frames but send frames only to discover a target wireless device (e.g., at the start of a call). Each transmitted frame may include an identifier for the target wireless device. For both background and active discoveries, the wireless device may send and/or receive frames during (a) pseudo-randomly selected time intervals or (b) time intervals determined based on timing obtained from a wireless communication network, e.g., a cellular network or a broadcast network.

Figure 6:
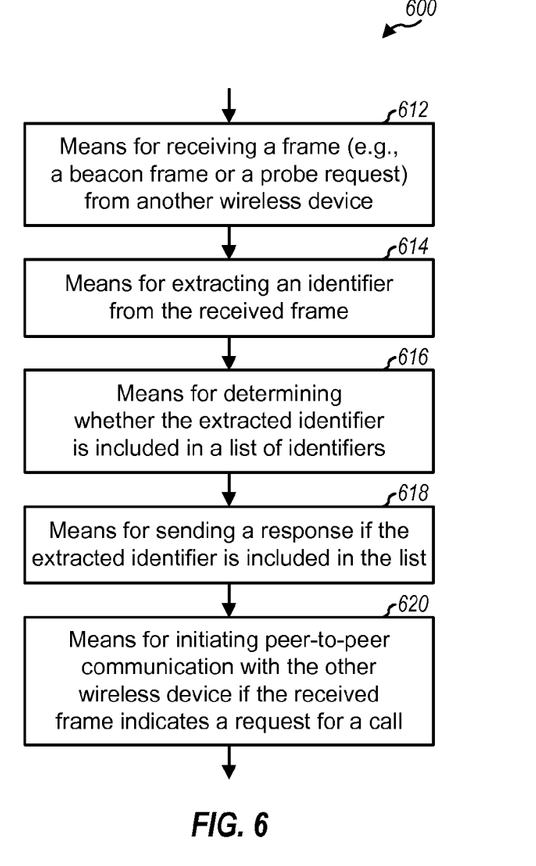
FIG. 6 shows an apparatus for performing discovery with a list of identifiers.

FIG. 6 shows an apparatus 600 for performing discovery. Apparatus 600 includes means for receiving a frame from another wireless device (block 612), means for extracting an identifier from the received frame (block 614), means for determining whether the extracted identifier is included in a list of identifiers (block 616), means for sending a response if the extracted identifier is included in the list (block 618), and means for initiating peer-to-peer communication with the other wireless device if the received frame indicates a request for a call (block 620).

Figure 7:
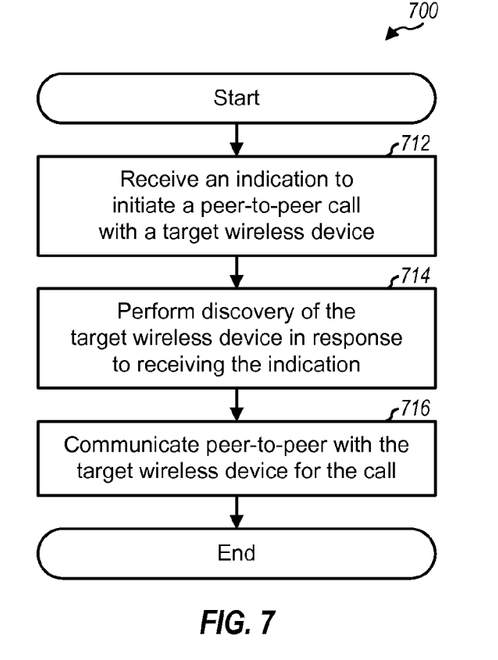
FIG. 7 shows a process for performing discovery at the start of a call.

FIG. 7 shows a process 700 for performing discovery at the start of a peer-to-peer call. A wireless device receives an indication (e.g., from a user) to initiate a peer-to-peer call with a target wireless device (block 712). The wireless device performs discovery of the target wireless device in response to receiving the indication (block 714). The wireless device may send at least one frame (e.g., probe request) identifying the target wireless device. Each transmitted frame may include an identifier for the target wireless device. The wireless device communicates peer-to-peer with the target wireless device for the call (block 716).

Figure 8:
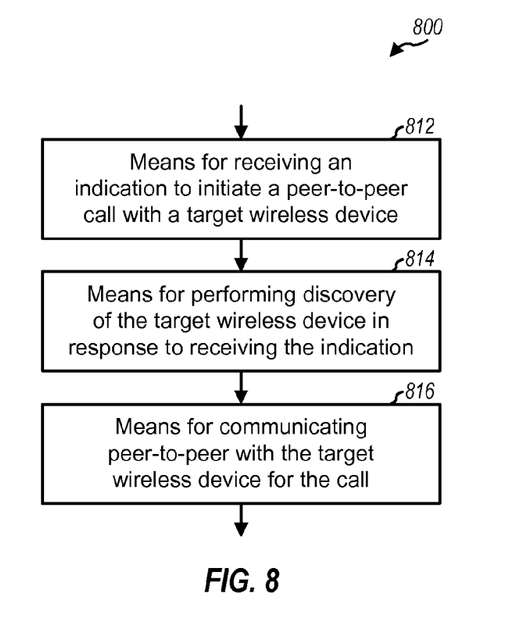
FIG. 8 shows an apparatus for performing discovery at the start of a call.

FIG. 8 shows an apparatus 800 for performing discovery. Apparatus 800 includes means for receiving an indication to initiate a peer-to-peer call with a target wireless device (block 812), means for performing discovery of the target wireless device in response to receiving the indication (block 814), and means for communicating peer-to-peer with the target wireless device for the call (block 816).

Figure 9:
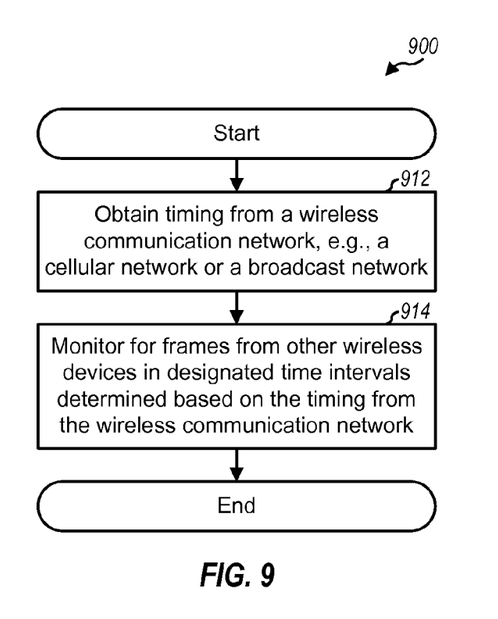
FIG. 9 shows a process for performing discovery using external timing.

FIG. 9 shows a process 900 for performing discovery using external timing. A wireless device obtains timing from a wireless communication network, e.g., a cellular network, a broadcast network, etc. (block 912). The wireless device monitors for frames from other wireless devices in designated time intervals determined based on the timing from the wireless communication network (block 914). The wireless device may sleep between the designated time intervals and may wake up prior to each designated time interval to monitor for frames from other wireless devices and/or to transmit frames.

Figure 10:
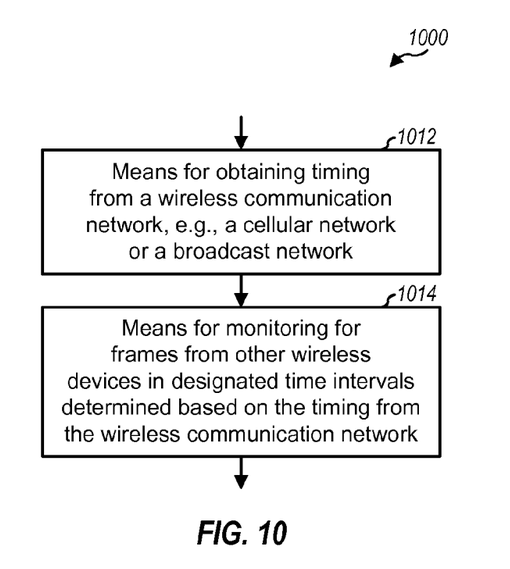
FIG. 10 shows an apparatus for performing discovery using external timing.

FIG. 10 shows an apparatus 1000 for performing discovery. Apparatus 1000 includes means for obtaining timing from a wireless communication network (block 1012), and means for monitoring for frames from other wireless devices in designated time intervals determined based on the timing from the wireless communication network (block 1014).

Figure 11:
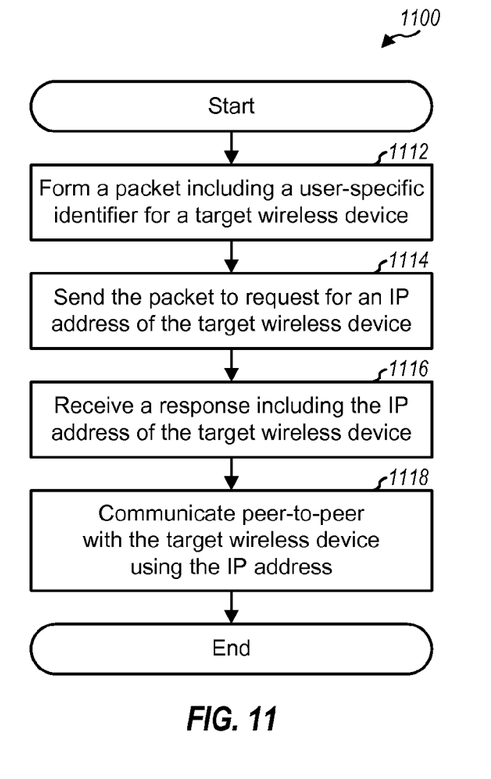
FIG. 11 shows a process for performing IP address discovery.

FIG. 11 shows a process 1100 for performing IP address discovery for a peer-to-peer call. A wireless device forms a packet including a user-specific identifier for a target wireless device (block 1112). The user-specific identifier may be based on (e.g., set to) a phone number or some other identification information for the target wireless device. The wireless device sends the packet to request for an IP address of the target wireless device (block 1114) and receives a response including the IP address of the target wireless device (block 1116). For blocks 1114 and 1116, the wireless device may broadcast the packet to other wireless devices and may receive the response from the target wireless device. Alternatively, the wireless device may send the packet to a server in a wireless network and may receive the response from the server. The wireless device may register with the server, e.g., prior to sending the packet. In any case, the wireless device communicates peer-to-peer with the target wireless device using the IP address (block 1118).

Figure 12:
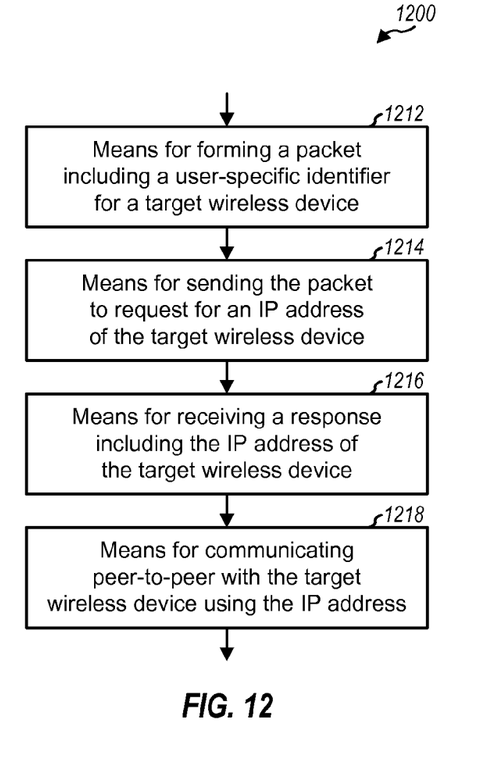
FIG. 12 shows an apparatus for performing IP address discovery.

FIG. 12 shows a process 1200 for performing IP address discovery. Apparatus 1200 includes means for forming a packet including a user-specific identifier for a target wireless device (block 1212), means for sending the packet to request for an IP address of the target wireless device (block 1214), means for receiving a response including the IP address of the target wireless device (block 1216), and means for communicating peer-to-peer with the target wireless device using the IP address (block 1218).

Figure 13:
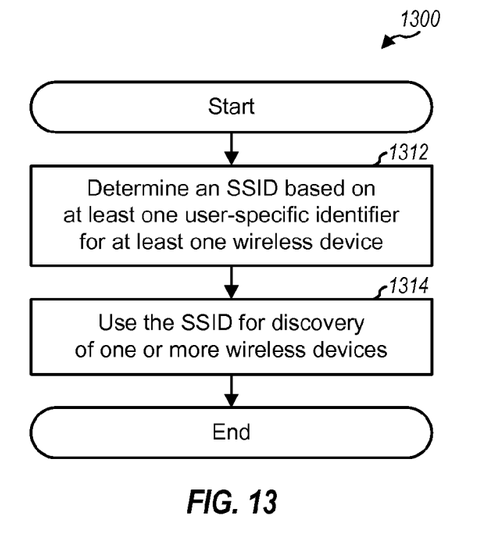
FIG. 13 shows a process for deriving and using an SSID.

FIG. 13 shows a process 1300 for deriving and using an SSID for an ad hoc wireless network. A wireless device determines an SSID based on at least one user-specific identifier for at least one wireless device (block 1312). The wireless device uses the SSID for discovery of one or more wireless devices (block 1314). The at least one wireless device may include this wireless device and/or a target wireless device for a peer-to-peer call. The one or more wireless devices may correspond to the target wireless device (for active discovery) or all wireless devices within the vicinity of this wireless device (for background discovery). The SSID may be derived based on (a) a phone number or some other identification information for this wireless device and/or (b) a phone number or some other identification information for the target wireless device. The wireless device may include the SSID in each frame sent to discover other wireless device(s) and/or may filter received frames based on the SSID.

Figure 14:
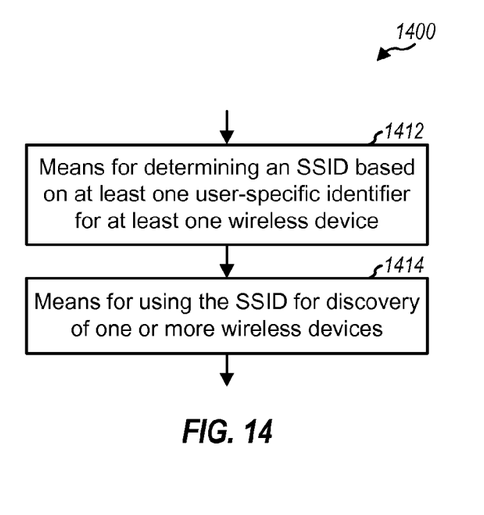
FIG. 14 shows an apparatus for deriving and using an SSID.

FIG. 14 shows an apparatus 1400 for deriving and using an SSID for an ad hoc wireless network. Apparatus 1400 includes means for determining an SSID based on at least one user-specific identifier for at least one wireless device (block 1412) and means for using the SSID for discovery of one or more wireless devices (block 1414).

Figure 15:
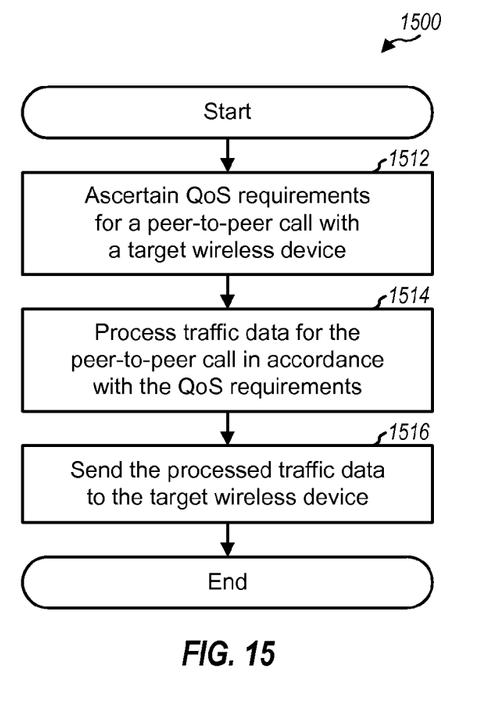
FIG. 15 shows a process for handling traffic data for a peer-to-peer call.

FIG. 15 shows a process 1500 for handling traffic data for a peer-to-peer call. The wireless device ascertains QoS requirements for the peer-to-peer call with a target wireless device (block 1512). The QoS requirements may relate to delay, data rate, etc. The wireless device processes traffic data for the peer-to-peer call in accordance with the QoS requirements (block 1514). For example, the wireless device may mark packets carrying the traffic data using at least one packet header field, e.g., the TOS field in IPv4, the traffic class field in IPv6, or the DS field. The wireless device may also classify the traffic data using APIs. The wireless device may also mark a buffer that stores the traffic data with handling information for the traffic data. The wireless device sends the processed traffic data to the target wireless device (block 1516).

Figure 16:
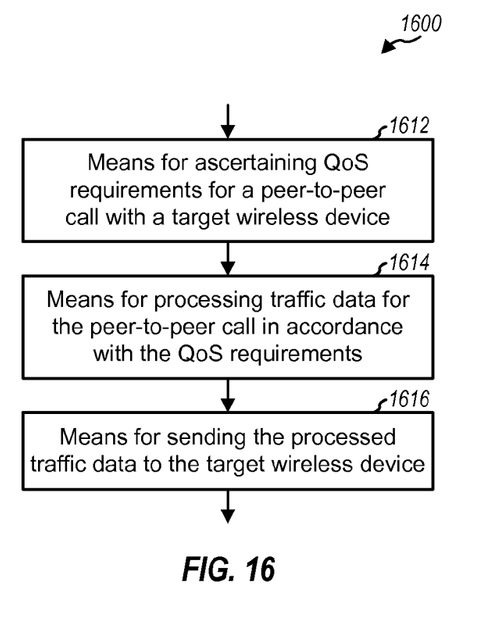
FIG. 16 shows an apparatus for handling traffic data for a peer-to-peer call.

FIG. 16 shows a process 1600 for handling traffic data for a peer-to-peer call. Apparatus 1600 includes means for ascertaining QoS requirements for the peer-to-peer call with a target wireless device (block 1612), means for processing traffic data for the peer-to-peer call in accordance with the QoS requirements (block 1614), and means for sending the processed traffic data to the target wireless device (block 1516).

Figure 17:
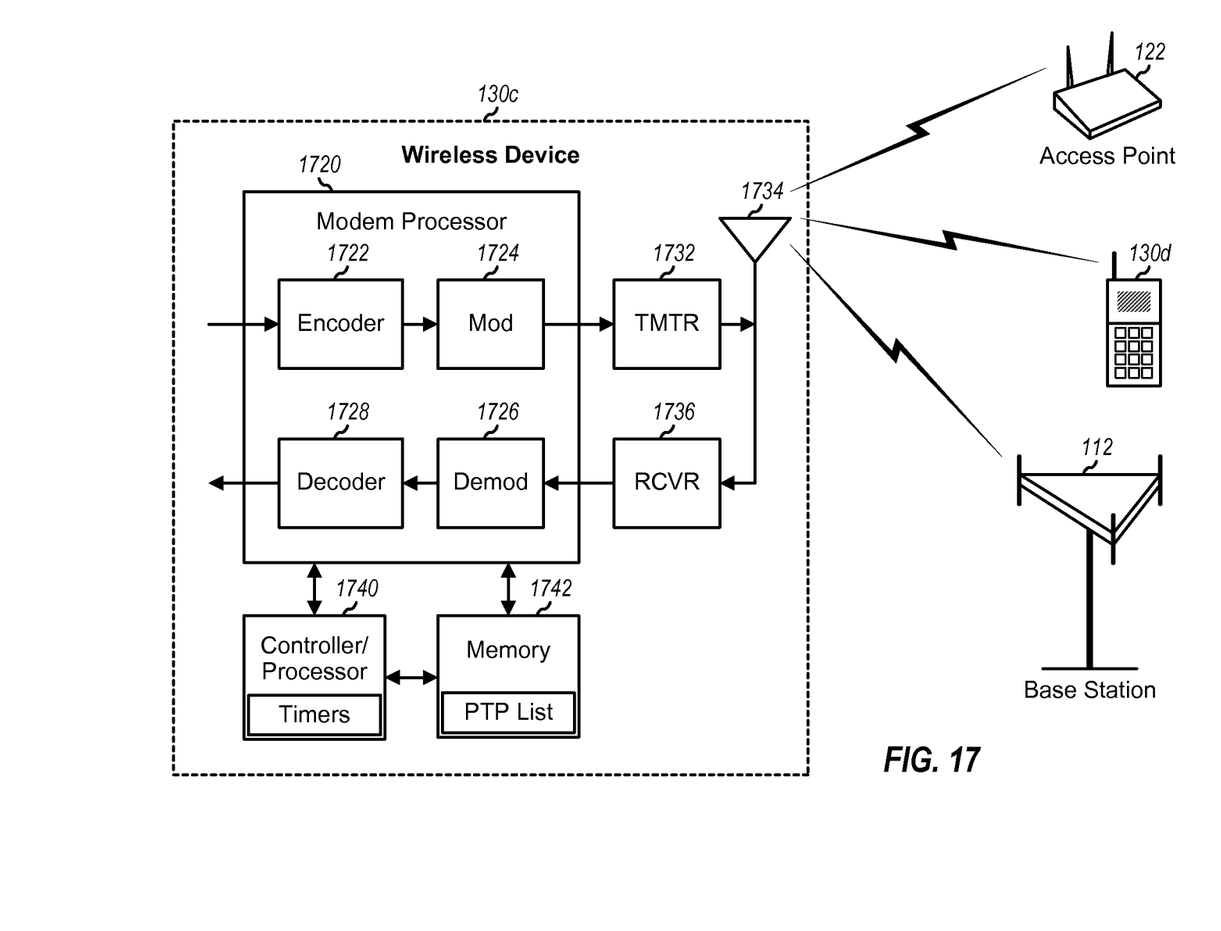
FIG. 17 shows a block diagram of a wireless device.

FIG. 17 shows a block diagram of a design of wireless device 130c, which is capable of communicating peer-to-peer with other wireless devices and also with WWAN 110 and WLAN 120. On the transmit path, traffic data to be sent by wireless device 130c is processed (e.g., formatted, encoded, and interleaved) by an encoder 1722 and further processed (e.g., modulated, channelized, and scrambled) by a modulator (Mod) 1724 in accordance with an applicable radio technology (e.g., for Wi-Fi or WWAN) to generate output chips. A transmitter (TMTR) 1732 then conditions (e.g., converts to analog, filters, amplifies, and upconverts) the output chips and generates a modulated signal, which is transmitted via an antenna 1734.

On the receive path, antenna 1734 receives signals transmitted by base stations in the WWAN, access points in the WLAN, and/or other wireless devices. A receiver (RCVR) 1736 conditions (e.g., filters, amplifies, downconverts, and digitizes) a received signal from antenna 1734 and provides samples. A demodulator (Demod) 1726 processes (e.g., descrambles, channelizes, and demodulates) the samples and provides symbol estimates. A decoder 1728 further processes (e.g., deinterleaves and decodes) the symbol estimates and provides decoded data. Encoder 1722, modulator 1724, demodulator 1726, and decoder 1728 may be implemented by a modem processor 1720. These units perform processing in accordance with the radio technology or technologies used for communication.

A controller/processor 1740 controls the operation at wireless device 130c. A memory 1742 store data and program codes for wireless device 130c. Controller/processor 1740 may implement process 300 in FIG. 3, process 500 in FIG. 5, process 700 in FIG. 7, process 900 in FIG. 9, process 1100 in FIG. 11, process 1300 in FIG. 13, process 1500 in FIG. 15, and/or other processes for peer-to-peer communication. Controller/processor 1740 may also implement timers that indicate when to sleep, when to send and receive frames for discovery, etc. Memory 1742 may store various types of information such as the PTP list shown in FIG. 2.

The techniques described herein may be implemented by various means. For example, the techniques may be implemented in hardware, firmware, software, or a combination thereof. For a hardware implementation, the processing units at a wireless device may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with instructions (e.g., procedures, functions, and so on) that may be used by one or more processors to perform the functions described herein. The instructions may be firmware and/or software codes may be stored in a memory (e.g., memory 1742 in FIG. 17) and executed by one or more processors (e.g., processor 1740). The memory may be implemented within the processor or external to the processor, stored in an external memory, in a computer program product, e.g. a cd-rom or other media, be in a memory at an external server, or the like.

Headings are included herein for reference and to aid in locating certain sections. These headings are not intended to limit the scope of the concepts described therein under, and these concepts may have applicability in other sections throughout the entire specification.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A wireless client device comprising:
   at least one processor configured to request a wireless network for access to the wireless network and obtain authorization for communication via the wireless network from another wireless client device of the wireless network, wherein a decision to authorize the wireless client device for communication via the wireless network is made at the another wireless client device and the another wireless client device corresponds to an administrative network element that is configured to determine which wireless client devices are permitted to access the wireless network and wherein the at least one processor is configured to initiate communication via the wireless network after obtaining authorization from the another wireless client device; and
   a memory coupled to the at least one processor.

2. The wireless client device of claim 1, wherein the at least one processor obtains authorization for restricted access covering a call being placed via the wireless network.

3. A method of operating a wireless client device, comprising:
   requesting a wireless network for access to the wireless network;
   obtaining authorization for communication from another wireless client device of the wireless network, wherein a decision to authorize the wireless client device for communication via the wireless network is made at the another wireless client device and the another wireless client device corresponds to an administrative network element that is configured to determine which wireless client devices are permitted to access the wireless network; and
   initiating communication via the wireless network after obtaining authorization from the another wireless client device.

4. The method of claim 3, wherein the obtained authorization corresponds to an authorization for at least one of:
   the wireless client device to access the wireless network in a time-restricted manner, or
   the wireless client device to partially access the wireless network, or
   the wireless client device to fully access the wireless network or access the wireless network in an unrestricted manner.

5. A wireless client device, comprising:
   at least one processor configured to receive, from a wireless network, an indication that another wireless client device has requested access to and authorization for communication with the wireless network, to determine whether to grant the another wireless client device's request to access the wireless network, and to notify the wireless network with regard to whether to grant access to the another wireless client device based on the determination; and
   a memory coupled to the at least one processor.

6. The wireless client device of claim 5, wherein the at least one processor is configured to determine whether to grant the another wireless client device time-restricted access, partial-access, full-access and/or unrestricted access to the wireless network.

7. A method of operating a wireless client device, comprising:
   receiving, from a wireless network, an indication that another wireless client device has requested access to and authorization for communication with the wireless network;
   determining whether to grant the another wireless client device's request to access the wireless network; and
   notifying the wireless network with regard to whether to grant access to the another wireless client device based on the determination.

8. The method of claim 7, wherein the determining step determines whether to grant the another wireless client device time-restricted access, partial-access, full-access and/or unrestricted access to the wireless network.

9. A wireless client device, comprising:
   means for requesting a wireless network for access to the wireless network;
   means for obtaining authorization for communication from another wireless client device of the wireless network, wherein a decision to authorize the wireless client device for communication via the wireless network is made at the another wireless client device and the another wireless client device corresponds to an administrative network element that is configured to determine which wireless client devices are permitted to access the wireless network; and
   means for initiating communication via the wireless network after obtaining authorization from the another wireless client device.

10. The wireless client device of claim 9, wherein the obtained authorization corresponds to an authorization for at least one of:
   the wireless client device to access the wireless network in a time-restricted manner, or
   the wireless client device to partially access the wireless network, or
   the wireless client device to fully access the wireless network or access the wireless network in an unrestricted manner.

11. A wireless client device, comprising:
   means for receiving, from a wireless network, an indication that another wireless client device has requested access to and authorization for communication with the wireless network;
   means for determining whether to grant the another wireless client device's request to access the wireless network; and
   means for notifying the wireless network with regard to whether to grant access to the another wireless client device based on the determination.

12. The wireless client device of claim 11, wherein the means for determining determines whether to grant the another wireless client device time-restricted access, partial-access, full-access and/or unrestricted access to the wireless network.

13. A non-transitory computer-readable medium containing instructions stored thereon, which, when executed by a wireless client device, cause the wireless client device to perform operations, the instructions comprising:
   at least one instruction to cause the wireless client device to request a wireless network for access to the wireless network;
   at least one instruction to cause the wireless client device to obtain authorization for communication from another wireless client device of the wireless network, wherein a decision to authorize the wireless client device for communication via the wireless network is made at the another wireless client device and the another wireless client device corresponds to an administrative network element that is configured to determine which wireless client devices are permitted to access the wireless network; and
   at least one instruction to cause the wireless client device to initiate communication via the wireless network after obtaining authorization from the another wireless client device.

14. The non-transitory computer-readable medium of claim 13, wherein the obtained authorization corresponds to an authorization for at least one of:
   the wireless client device to access the wireless network in a time-restricted manner, or
   the wireless client device to partially access the wireless network, or
   the wireless client device to fully access the wireless network or access the wireless network in an unrestricted manner.

15. A non-transitory computer-readable medium containing instructions stored thereon, which, when executed by a wireless client device, cause the wireless client device to perform operations, the instructions comprising:
   at least one instruction to cause the wireless client device to receive, from a wireless network, an indication that another wireless client device has requested access to and authorization for communication with the wireless network;
   at least one instruction to cause the wireless client device to determine whether to grant the another wireless client device's request to access the wireless network; and
   at least one instruction to cause the wireless client device to notify the wireless network with regard to whether to grant access to the another wireless client device based on the determination.

16. The non-transitory computer-readable medium of claim 15, wherein the at least one instruction to cause the wireless client device to determine determines whether to grant the another wireless client device time-restricted access, partial-access, full-access and/or unrestricted access to the wireless network.

* * * * *